G. BRAY, Jr.
CARRIAGE POLE-HEADS.

No. 184,496.  Patented Nov. 21, 1876.

WITNESSES:
C. Neveux
John Goethals

INVENTOR:
George Bray Jr.
BY
ATTORNEYS.

UNITED STATES PATENT OFFICE.

GEORGE BRAY, JR., OF DEPTFORD, ENGLAND.

IMPROVEMENT IN CARRIAGE-POLE HEADS.

Specification forming part of Letters Patent No. 184,496, dated November 21, 1876; application filed May 27, 1876.

*To all whom it may concern:*

Be it known that I, GEORGE BRAY, Jr., of Deptford, in the county of Kent, England, have invented a new and Improved Pole-Head for Wagons, of which the following is a specification:

The object of my invention is to contrive a simple arrangement of the pole-head for securely holding the pole straps or chains, and being easily shifted for connecting and disconnecting them, and which will disconnect the strap or chain self-actingly in case a horse falls down.

The invention consists of the eye-pieces for holding the straps or chains, made in separate parts, which are attached to the pole by separate socket-pieces, one of which is rigidly fixed on the pole, while the other is capable of turning for opening and closing the eyes, and the two socket parts have cam projections, and are fixed with a spring, by which the eyes are kept closed, but which allow them to open, by a certain amount of pressure, to allow the straps or chains to escape.

Figure 1:
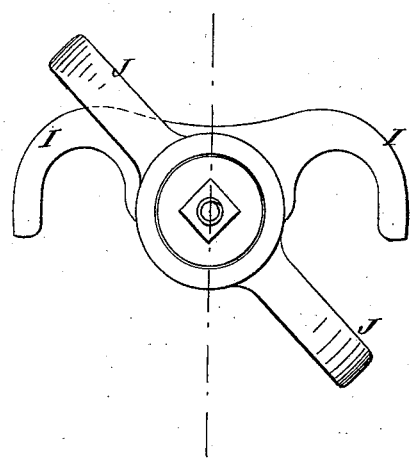
Figure 2:
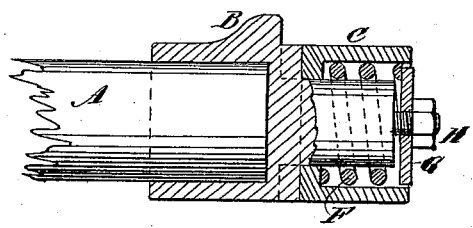
Figure 3:
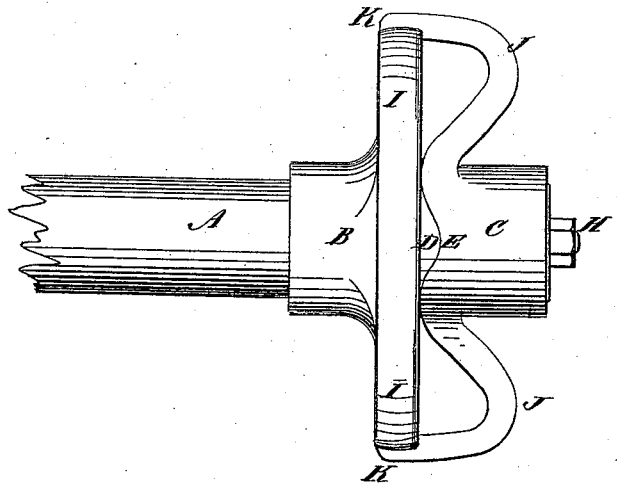

Figure 1 is an end elevation of a pole-head contrived according to my invention. Fig. 2 is a sectional elevation, taken on line $x\ x$, Fig. 1; and Fig. 3 is a plan view.

Similar letters of reference indicate corresponding parts.

A is the pole, on which the part B of the socket for attaching the head is rigidly fixed, while the part C is fitted so as to turn. The two parts are constructed with cam projections and depressions D E on the ends meeting together, and a spring, F, washer G, and nut H press them together, so that the projections of one are forced into the depressions of the other, and the turning part C is thereby kept in the required position for closing the eyes for the pole straps or chains, which eyes consist of the vertically-curved arms I, and the horizontally-curved arms J, which are closed, as represented at K, when part C of the head is subject to the action of the spring, but which open, as in Fig. 1, either way, according to the direction in which the power is applied, to allow of connecting and disconnecting the straps or chains. The vertically-curved arms I hook into the pole straps or chains to support the tongue thereby; and in case a horse falls the chain or strap pulls down on one of the arms J, so that it turns said arm down, and opens the eye for its escape.

The cam projections and depressions, and the spring, and the devices for confining it, may be modified in various ways; and I do not claim, nor do I limit myself, to the mere constructive details hereinbefore described; but

Having thus described my invention, I claim as new and desire to secure by Letters Patent—

The combination of the stationary part B, having cam projections D and arms I, the movable part C, having depressions E and arms J, and the spring F with the pole A, substantially as and for the purpose set forth.

The above specification signed by me.

GEORGE BRAY, JR. [L. S.]

Witnesses:
 T. MORGAN,
  21 *Cockspur street, London, S. W.*
 W. HILLIER,
  21 *Cockspur street, London, S. W.*